(12) United States Patent
Baker et al.

(10) Patent No.: US 8,867,397 B2
(45) Date of Patent: Oct. 21, 2014

(54) METHOD AND APPARATUS FOR UPLINK POWER CONTROL IN AN ORTHOGONAL FREQUENCY DIVISION MULTIPLE ACCESS COMMUNICATION SYSTEM

(71) Applicant: Motorola Solutions, Inc., Schaumburg, IL (US)

(72) Inventors: Michael H. Baker, Elmhurst, IL (US); Ethan Y. Chen, Wilmette, IL (US); Xiaowei Jin, Palatine, IL (US); Isam R. Makhlouf, Lake Zurich, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 120 days.

(21) Appl. No.: 13/653,984

(22) Filed: Oct. 17, 2012

(65) Prior Publication Data

US 2014/0105040 A1 Apr. 17, 2014

(51) Int. Cl.
*H04B 1/10* (2006.01)
*H04B 15/00* (2006.01)
*H04W 28/02* (2009.01)

(52) U.S. Cl.
CPC ...... *H04W 28/0221* (2013.01); *H04W 28/0236* (2013.01)
USPC .......................................... 370/252; 370/328

(58) Field of Classification Search
None
See application file for complete search history.

(56) References Cited

U.S. PATENT DOCUMENTS

| | | | |
|---|---|---|---|
| 5,487,174 A | 1/1996 | Persson | |
| 5,634,192 A | 5/1997 | Meche et al. | |
| 5,862,489 A | 1/1999 | Aalto | |
| 6,041,235 A | 3/2000 | Aalto | |
| 6,192,245 B1 | 2/2001 | Jones et al. | |
| 8,031,673 B2 | 10/2011 | Craig et al. | |
| 8,447,344 B2 * | 5/2013 | Ratasuk et al. | 455/522 |
| 2007/0010253 A1 * | 1/2007 | Gunnarsson et al. | 455/442 |
| 2007/0191013 A1 | 8/2007 | Gunnarsson et al. | |
| 2011/0076962 A1 * | 3/2011 | Chen et al. | 455/68 |

(Continued)

FOREIGN PATENT DOCUMENTS

| | | |
|---|---|---|
| EP | 1233639 B1 | 6/2010 |
| EP | 2413644 A2 | 2/2012 |
| WO | 0101720 A1 | 1/2001 |

OTHER PUBLICATIONS

International Search Report and Written Opinion for counterpart International Patent Application No. PCT/US2013/055705 mailed Nov. 29, 2013.

(Continued)

*Primary Examiner* — Jay P Patel
(74) *Attorney, Agent, or Firm* — Steven A. May (57) ABSTRACT

A communication system minimizes inter-cell interference and handover holes by providing for a user equipment (UE) to monitor downlink signals from a serving, boundary eNodeB and one or more neighbor eNodeBs, determine a signal quality metric (SQM) for each monitored signal to produce an SQM associated with each eNodeB, and determine a maximum uplink transmit power level (PMAX) for each eNodeB. Based on the determined SQMs and PMAXs, the UE determines a eNodeB of the one or more neighbor eNodeBs with a best SQM and, in response to determining that the neighbor eNodeB of the one or more neighbor eNodeBs with a best SQM is a high power eNodeB, determines a difference between the SQM associated with the high power ENodeB and the SQM associated with the boundary eNodeB. The UE then sets a PMAX for the UE based on the difference determination.

19 Claims, 4 Drawing Sheets

(56) References Cited

U.S. PATENT DOCUMENTS

| | | |
|---|---|---|
| 2011/0211560 A1 | 9/2011 | Yamamoto et al. |
| 2011/0223906 A1 | 9/2011 | Hall et al. |
| 2011/0237288 A1* | 9/2011 | Ratasuk et al. ............... 455/522 |
| 2011/0310781 A1* | 12/2011 | Kim et al. ..................... 370/311 |
| 2011/0319122 A1 | 12/2011 | Zhou et al. |
| 2012/0115532 A1* | 5/2012 | He et al. ....................... 455/522 |
| 2012/0214537 A1* | 8/2012 | Kim et al. ..................... 455/522 |
| 2012/0224552 A1* | 9/2012 | Feuersanger et al. ......... 370/329 |
| 2012/0327804 A1* | 12/2012 | Park et al. ..................... 370/252 |
| 2013/0051261 A1* | 2/2013 | Kazmi et al. .................. 370/252 |
| 2013/0053103 A1* | 2/2013 | Kim et al. ..................... 455/561 |
| 2013/0153298 A1* | 6/2013 | Pietraski et al. ................ 175/45 |
| 2013/0176953 A1* | 7/2013 | Stern-Berkowitz et al. .. 370/329 |
| 2013/0310103 A1* | 11/2013 | Madan et al. .................. 455/522 |
| 2013/0329711 A1* | 12/2013 | Seo et al. ...................... 370/336 |

OTHER PUBLICATIONS

Aziz, D. and Sigle, R., "Improvement of LTE Handover Performance through Interference Coordination," IEEE 69th Vehicular Technology Conference, 2009, VTC Spring 2009, Apr. 26-29, 2009, pp. 1-5.

* cited by examiner

| eNodeB_ID | PCI | EGCI | PMAX | SQM |
|---|---|---|---|---|
| eNodeB_1 | PCI1 | EGCI1 | PMAX1 | SQM1 |
| eNodeB_2 | PCI2 | EGCI2 | PMAX2 | SQM2 |
| eNodeB_3 | PCI3 | EGCI3 | PMAX3 | SQM3 |

METHOD AND APPARATUS FOR UPLINK POWER CONTROL IN AN ORTHOGONAL FREQUENCY DIVISION MULTIPLE ACCESS COMMUNICATION SYSTEM

FIELD OF THE INVENTION

The present invention relates generally to wireless communication systems and more particularly to uplink power control in an Orthogonal Frequency Division Multiple Access (OFDMA) wireless communication systems.

BACKGROUND OF THE INVENTION

Wireless communication services in rural areas typically are provided by a low density distribution of base sites with a large inter-site distance (ISD). On the other hand, in denser urban/suburban areas, wireless communication services typically are provided by a higher density distribution of base sites with a smaller inter-site distance. Correspondingly, mobile devices operating in rural areas may need to be permitted to transmit at higher maximum uplink power levels in order to communicate with a nearest base site, while a lower maximum uplink transmit power level may suffice for mobile devices operating in urban/suburban areas.

The Third Generation Partnership Project Long Term Evolution (3GPP LTE) communication standards provide for base sites to broadcast their maximum allowable uplink transmit power level (PMAX), so that served mobile terminals can determine an appropriate uplink power level. However, when a roaming mobile terminal is in a boundary area between a high PMAX base site and a low PMAX base site, handover holes and/or uplink signal-to-interference-plus-noise (SINR) desensitization can occur when the mobile terminal employs a maximum uplink power level that is inappropriate for either a serving or a neighbor base site.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

To address the need for minimizing inter-cell interference and handover holes, a wireless communication system is provided that includes a boundary cell/eNodeB wherein a user equipment (UE) transitions up to its maximum uplink transmit power level (PMAX). The UE monitors downlink signals from a serving, boundary eNodeB and one or more neighbor eNodeBs, determines a signal quality metric (SQM) for each monitored signal to produce an SQM associated with each eNodeB, and determines a maximum uplink transmit power level (PMAX) for each eNodeB. Based on the determined signal quality metrics and PMAXs, the UE determines an eNodeB of the one or more neighbor eNodeBs with a best signal quality metric and, in response to determining that the neighbor eNodeB of the one or more neighbor eNodeBs with a best signal quality metric is a high power eNodeB, determines a difference between the signal quality metric associated with the high power eNodeB and the signal quality metric associated with the boundary eNodeB. The UE then sets a PMAX for the UE based on the difference determination.

Generally, an embodiment of the present invention encompasses a method for setting a maximum uplink transmit power of a user equipment in an Orthogonal Frequency Division Multiple Access (OFDMA) communication system. The method includes monitoring downlink signals from a serving eNodeB and one or more neighbor eNodeBs, wherein the serving eNodeB is a boundary eNodeB and wherein a boundary eNodeB is an eNodeB that supports a maximum uplink transmit power level that is between a maximum uplink transmit power level supported by a high power eNodeB and a maximum uplink transmit power level supported by a low power eNodeB, wherein a high/low power eNodeB is an eNodeB that broadcasts a high/low PMAX value for uplink transmissions, determining a signal quality metric for each monitored signal to produce a signal quality metric associated with each of the serving eNodeB and the one or more neighbor eNodeBs, determining a maximum uplink transmit power level for each of the serving eNodeB and the one or more neighbor eNodeBs, and for each of the serving eNodeB and the one or more neighbor eNodeBs, storing the maximum uplink transmit power level determined for the eNodeB in association with an identifier associated with the eNodeB. The method further includes, based on the determined signal quality metrics and maximum uplink transmit power levels, determining whether a neighbor eNodeB of the one or more neighbor eNodeBs with a best signal quality metric is a high power eNodeB, in response to determining that the neighbor eNodeB of the one or more neighbor eNodeBs with a best signal quality metric is a high power eNodeB, determining a difference between the signal quality metric associated with the high power eNodeB and the signal quality metric associated with the boundary eNodeB, and setting a maximum uplink transmit power level for the user equipment based on the difference determination.

Another embodiment of the present invention encompasses a UE capable of operating in an OFDMA communication system. The UE includes a receiver that is configured to monitor downlink signals from a serving eNodeB and one or more neighbor eNodeBs and a processor that is configured to monitor downlink signals from a serving eNodeB and one or more neighbor eNodeBs, wherein the serving eNodeB is a boundary eNodeB and wherein a boundary eNodeB is an eNodeB that supports a maximum uplink transmit power level that is between a maximum uplink transmit power level supported by a high power eNodeB and a maximum uplink transmit power level supported by a low power eNodeB, determine a signal quality metric for each monitored signal to produce a signal quality metric associated with each of the serving eNodeB and the one or more neighbor eNodeBs, determine a maximum uplink transmit power level for each of the serving eNodeB and the one or more neighbor eNodeBs, and for each of the serving eNodeB and the one or more neighbor eNodeBs, store the maximum uplink transmit power level determined for the eNodeB in association with an identifier associated with the eNodeB. The processor further is configured to, based on the determined signal quality metrics and maximum uplink transmit power levels, determine whether a neighbor eNodeB of the one or more neighbor eNodeBs with a best signal quality metric, in response to determining that the neighbor eNodeB of the one or more neighbor eNodeBs with a best signal quality metric is a high power eNodeB, determine a difference between the signal quality metric associated with the high power eNodeB and the signal quality metric associated with the boundary eNodeB, and set a maximum uplink transmit power level for the user equipment based on the difference determination.

Yet another embodiment of the present invention encompasses a wireless communication system comprising a first eNodeB that supports a first maximum uplink transmit power level, a second eNodeB that supports a second maximum uplink transmit power level, wherein the second maximum uplink transmit power level is less than the first maximum uplink transmit power level, and a third eNodeB that supports a third maximum uplink transmit power level, wherein the third maximum uplink transmit power level is less than the second maximum uplink transmit power level. Each eNodeB of the first, second, and third eNodeBs broadcasts an indication of the maximum uplink transmit power level supported by the eNodeB and each of the first eNodeB and the third eNodeB is a neighbor of the second eNode B.

Figure 1:
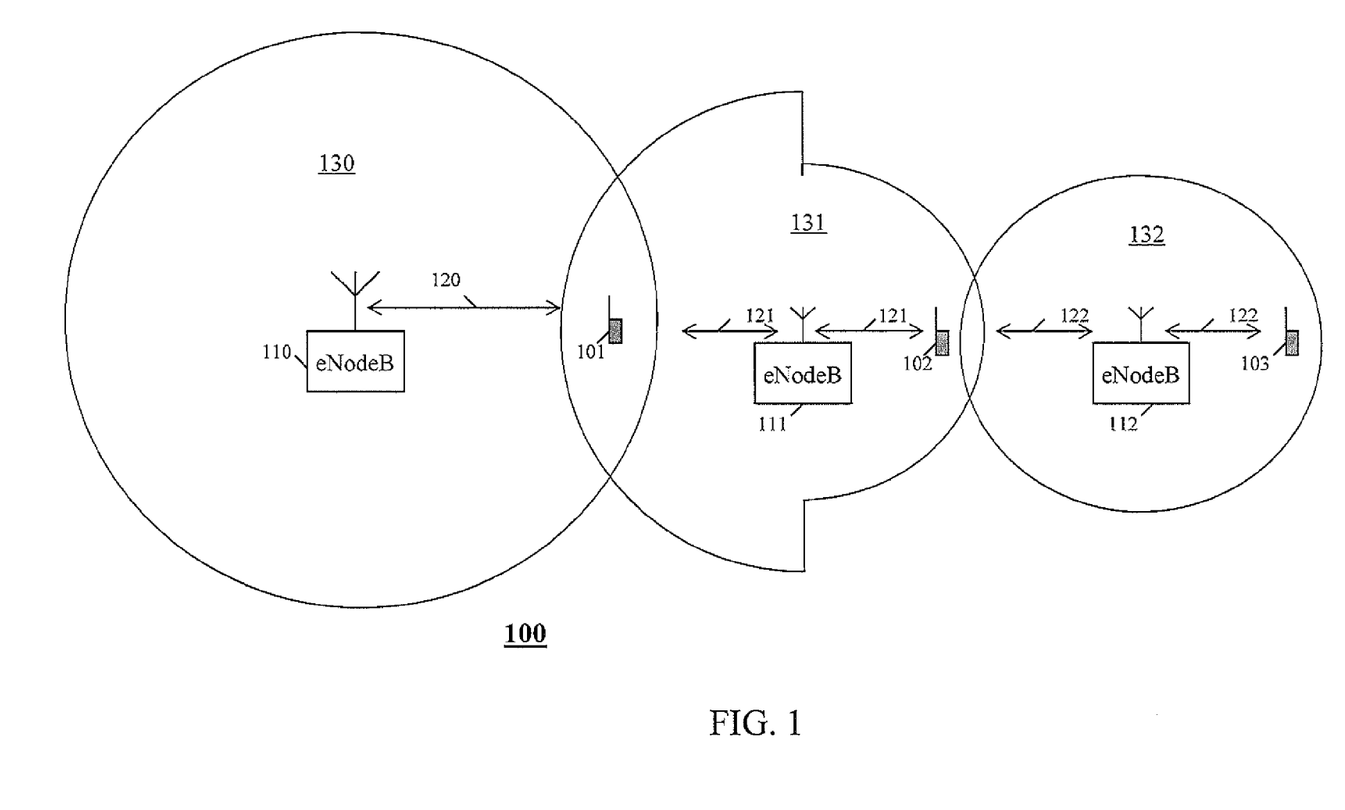
FIG. 1 is a block diagram of a wireless communication system in accordance with an embodiment of the present invention.

The present invention may be more fully described with reference to FIGS. 1-5B. FIG. 1 is a block diagram of a wireless communication system 100 in accordance with an embodiment of the present invention. Communication system 100 includes a wireless communication network comprising multiple eNodeBs 110-112 (three shown). Each eNodeB of the multiple eNodeBs 110-112 provides wireless communication services to users equipment (UEs) residing in a corresponding cell, such as a coverage area of a site or a sector of a site, 130-132 (hereinafter collectively referred to as a "cell") served by the eNodeB via a corresponding air interface 120-122. Each air interface 120-122 comprises a respective downlink and a respective uplink. Each downlink and uplink comprises multiple physical communication channels, including at least one signaling, or overhead, channel and at least one traffic channel. Communication system 100 further includes multiple users' equipment (UEs) 101-103, such as but not limited to a cellular telephone, a radio telephone, or a personal digital assistant (PDA), tablet computer, or laptop computer with radio frequency (RF) capabilities. In various technologies, UEs 101-103 may be referred to, for example, as a subscriber unit, remote unit, subscriber station, mobile station, mobile terminal, user terminal, and the such.

For the purpose of illustrating the principles of the present invention, cell 130 is a 'high power' cell and corresponding eNodeB 110 is a 'high power' eNodeB (that is, relative to a low power cell/eNodeB), in the sense that they employ a high maximum uplink power level, for example, 2 W (Watt) or 33 dBm. Further, cell 132 is a 'low power' cell and corresponding eNodeB 112 is a 'low power' eNodeB (that is, relative to a high power cell/eNodeB), in the sense that they employ a low maximum uplink power level, for example, 200 mW (milliwatt) or 23 dBm. Cell 131 is a 'boundary cell,' in the sense that it is located between a high power cell (cell 130) and a low power cell (cell 132), and correspondingly eNodeB 111 may be referenced to herein as a 'boundary' eNodeB. A boundary cell/eENodeB employs a maximum uplink power level that is somewhere in-between that of a high power cell and a low power cell, and preferably is closer to the power level of the former than the power level of the latter. For example, for the purpose of illustrating the principles of the present invention, cell 131/eNodeB 111 may employ a maximum uplink power level of 32 dBm, which is slightly below the maximum uplink power level of 33 dBm of high power cell 130/eNodeB 110. A UE then is in a "boundary state" when the UE is attached to a boundary cell and is between, that is, resides in an overlapping coverage area of, a high power cell/eNodeB and a boundary cell/eNodeB.

3GPP (Third Generation Partnership Project) LTE (Long Term Evolution) communication systems typically employ single frequency reuse, or "reuse-1" spectrum schemes, in which the same frequency band is shared by all eNodeBs. As a result, there is a strong potential for interference issues to arise when a UE at a cell boundary is allocated the same resources by its serving eNodeB as a nearby UE connected to a neighboring eNodeB. This problem is especially severe if a UE that is communicating with, for example, eNodeB 111 at a high power level (for example, 33 dBm) (which may be referred to herein as a 'high power UE') in cell 131 approaches eNodeB 112, whose UEs are limited to a lower power level (for example, 23 dBm)) (which may be referred to herein as 'low power UEs'). In this case, a Signal-to-Interference plus Noise Ratio (SINR) observed by a low power UE communicating with eNodeB 112 may be degraded due to interference from the high power UE communicating with eNodeB 111. At the same time, as a UE that is communicating with eNodeB 111 approaches the region in cell 131 between eNodeB 110 and eNodeB 111 it may need to transmit at a high power level in order to maintain connectivity to eNodeB 111. In this case, if cell 130/eNodeB 110 is high power, the inherent cell boundary interference issues with reuse-1 cellular systems is no worse than usual since all UEs communicating with eNodeB 110 are also permitted to use high power.

In order to inform served UEs of a maximum uplink transmit power that the UEs may use, each of eNodeBs 110-112 broadcasts a maximum uplink transmit power level (PMAX) overhead message, for example, a System Information (SI) message in a 3GPP LTE communication system, indicating, for example, in a System Information Block 1 (SIB1) element of an SI message, a maximum uplink power level (PMAX) supported by the eNodeB. For example, high power eNodeB 110 may broadcast a first PMAX message indicating that the eNodeB supports a maximum uplink power level (PMAX) of 2 W, or 33 dBm, boundary eNodeB 111 may broadcast a second PMAX message indicating that the eNodeB supports a maximum uplink power level (PMAX) of 32 dBm, and low power eNodeB 112 may broadcast a third PMAX message indicating that the eNodeB supports a maximum uplink power level (PMAX) of 200 mW, or 23 dBm.

PMAX is a variable, that is, a parameter, that eNodeBs, such as eNodeBs 110-112, broadcast to UEs, such as UEs 101-103. A UE, such as a 3GPP LTE UE, then uses PMAX as an upper bound on its transmit power. A 3GPP LTE UE also has a power class that typically is hardcoded into the UE during manufacturing. Communication system 100 then provides for a UE to change its maximum transmit power based on a difference, or delta, in signal quality metrics (SQMs) between a serving eNodeB and a high power eNodeB. For example, the UE may change the UE's maximum transmit power by either adjusting PMAX into the UE's (LTE) chipset or by modifying the UE's power class, also within the (LTE) chipset.

While 2 W and 200 mW are referenced herein as the maximum uplink power levels supported by a high power cell and a low power cell, respectively, the specific maximum uplink power levels of the cells are not critical to the invention as the maximum uplink power levels for the high power and low power cells may depend upon such factors as a geographical size of a cell and a topology of a cell. The maximum uplink power levels for each such cell may be up to a designer of communication system 100 and any value may be used herein so long as the maximum uplink power level of a high maximum uplink power cell, that is, cell 130, is greater than the maximum uplink power level of a low maximum uplink power cell, that is, cell 132.

Figure 2:
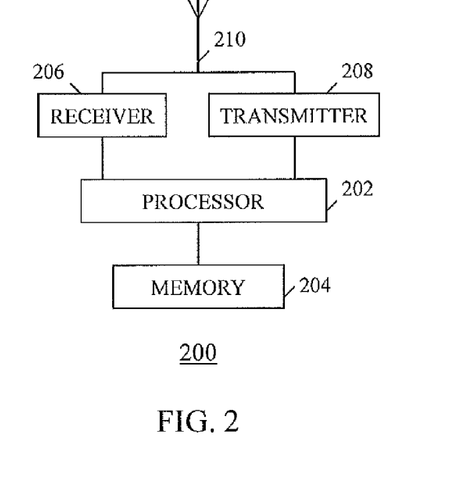
FIG. 2 is a block diagram of an eNodeB of FIG. 1 in accordance with an embodiment of the present invention.

FIG. 2 is a block diagram of an eNodeB 200, such as eNodeBs 110-112, in accordance with an embodiment of the present invention. eNodeB 200 includes a processor 202, such as one or more microprocessors, microcontrollers, digital signal processors (DSPs), combinations thereof or such other devices known to those having ordinary skill in the art. The particular operations/functions of processor 202, and thus of eNodeB 200, are determined by an execution of software instructions and routines that are stored in a respective at least one memory device 204 associated with the processor, such as random access memory (RAM), dynamic random access memory (DRAM), and/or read only memory (ROM) or equivalents thereof, that maintains data and programs that may be executed by processor 202. At least one memory device 204 further maintains a neighbor list (not shown) that comprises an eNodeB identifier or a cell identifier associated with each eNodeB, or cell, in the list, such as one or more of a base station identifier (BS_ID), a Physical Cell Identifier (PCI), a Target Cell Identifier (TCI), and a E-UTRAN Cell Global Identifier (ECGI), of neighbor cells and further may include a neighbor relation function that adds new neighbor cells to, and deletes outdated neighbor cells from, the neighbor list.

eNodeB 200 further includes a radio frequency (RF) receiver 206 and an RF transmitter 208 that are each coupled to processor 202 and to an antenna 210 and that respectively provide for a receipt of RF signals from, and transmission of RF signals to, UEs residing in a coverage area, such as coverage areas 130-132, of the eNodeB.

Figure 3:
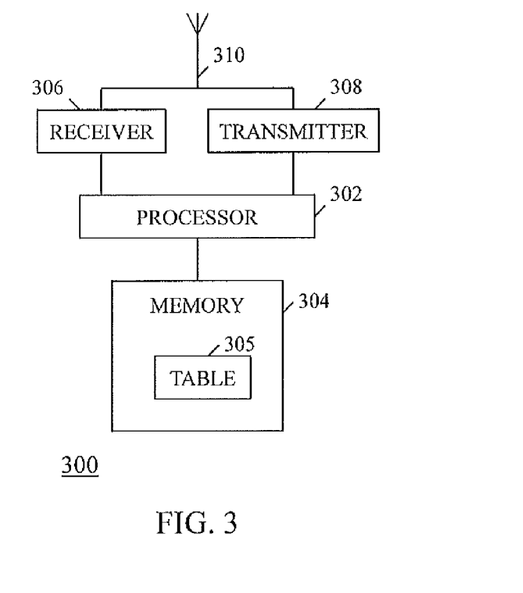
FIG. 3 is a block diagram of a user equipment of FIG. 1 in accordance with an embodiment of the present invention.

Referring now to FIG. 3, a block diagram is provided of a UE 300, such as UEs 101-103, in accordance with an embodiment of the present invention. UE 300 includes a processor 302, such as one or more microprocessors, microcontrollers, digital signal processors (DSPs), combinations thereof or such other devices known to those having ordinary skill in the art. The particular operations/functions of processor 302, and respectively thus of UE 300, is determined by an execution of software instructions and routines that are stored in an at least one memory device 304 associated with the processor, such as random access memory (RAM), dynamic random access memory (DRAM), and/or read only memory (ROM) or equivalents thereof, that maintains data and programs that may be executed by the corresponding processor. At least one memory device further maintains one or more signal quality metric differential thresholds ('ΔSQM_THRESHs'), which thresholds are described in greater detail below.

Figure 4:
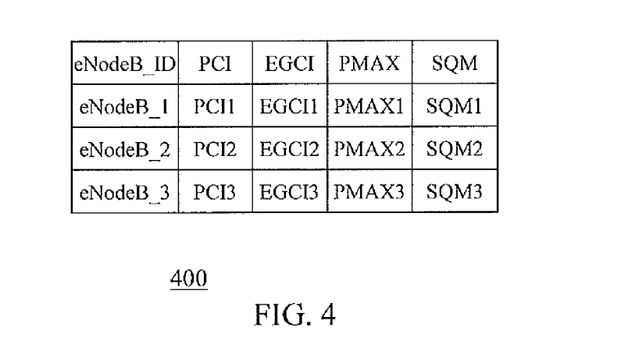
FIG. 4 is a block diagram of an exemplary lookup table maintained by the user equipment of FIG. 3 in accordance with an embodiment of the present invention.

In addition, at least one memory device 304 maintains a separate lookup table 305 for each eNodeB 110-112 that lists a PMAX associated with each of the serving eNodeB's multiple neighbor eNodeBs. This provides a unique mapping, given the serving eNodeB identifier, of a cell identifier associated with the neighbor eNodeB and a PMAX associated with the neighbor eNodeB. Table 305 may be pre-provisioned to the UE by an operator of communication system 100 or may be conveyed to the UE by a serving eNodeB, for example, when conveying a neighbor list. An exemplary such lookup table 400 is depicted in FIG. 4, wherein each row of the lookup table is associated with a neighbor eNodeB to a given serving eNodeB and lists, in association with each neighbor eNodeB, one or more identifiers associated with the eNodeB, for example, a identifier that uniquely identifies a serving eNodeB, such as an EGCI, and a local identifier for each neighbor eNodeB that may be used to distinguish all neighbor eNodeBs of the serving eNodeB from each other but which local identifiers are not necessarily unique system-wide (that is, may be repeated with respect to neighbor eNodeBs of other serving eNodeBs), such as a PCI, a PMAX associated with the eNodeB, and a signal quality metric (SQM), for example, a Reference Signal Received Power (RSRP), a signal-to-noise ratio (SNR), a signal-to-interference-plus-noise ratio (SINR), a carrier-to-interference-plus-noise ratio (CINR), a bit energy-to-noise density ratio (Eb/Io), and/or a bit error rate (BER), determined by the UE based on a reference signal received from the eNodeB.

At least one memory device 304 also maintains a power class that typically is hardcoded into the at least one memory device during manufacturing and further may maintain a PMAX currently being utilized by the UE. A high power UE, as described herein, would be configured as a high power (2 W) power class and a low power UE, as described herein, would be configured as a low power (200 mW) power class. The UE may change the UE's maximum transmit power by either adjusting PMAX into a (LTE) chipset of the UE or by modifying the UE's power class, also within the (LTE) chipset. In various embodiments of the present invention, communication system 100 may provide for uplink transmit power to be controlled by adjusting UE PMAX in processors 202/302, which processors also control the processing of SQM by the eNodeBs and UEs as described herein.

UE 300 further includes a radio frequency (RF) receiver 306 and an RF transmitter 308 that are each coupled to processor 302 and to an antenna 310 and that respectively provide for a receipt of RF signals from, and transmission of RF signals to, one or more eNodeBs in communication with the UE.

The embodiments of the present invention preferably are implemented within eNodeBs 110-112 and UEs 101-103. More particularly, the functionality described herein as being performed by each of eNodeBs 110-112 is implemented with or in software programs and instructions stored in the at least one memory device 204 of the eNodeB and executed by an associated processor 202 of the eNodeB, and the functionality described herein as being performed by UEs 101-103 is implemented with or in software programs and instructions stored in the at least one memory device 304 of the UE and executed by the associated processor 302 of the UE. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UEs 101-103 and eNodeBs 110-112. Based on the present disclosure, one skilled in the art will be readily capable of producing and implementing such software and/or hardware without undo experimentation.

Communication system 100 comprises a wideband packet data communication system that employs an Orthogonal Frequency Division Multiple Access (OFDMA) modulation scheme for transmitting data over air interface 120, wherein a frequency channel, or bandwidth, is split into multiple frequency sub-bands, wherein each sub-band, or resource block, comprises multiple orthogonal frequency sub-carriers that are the physical layer channels over which traffic and signaling channels are transmitted in a TDM or TDM/FDM fashion. A user may then be assigned one or more of the resource blocks for an exchange of bearer information, thereby permitting multiple users to transmit simultaneously on the different resource blocks such that each user's transmission is orthogonal to the other users' transmissions. In addition, communication system 100 preferably operates in accordance with the 3GPP (Third Generation Partnership Project) LTE (Long Term Evolution) standards, which standards specify wireless telecommunications system operating protocols, including radio system parameters and call processing procedures. However, those who are of ordinary skill in the art realize that communication system 100 may operate in accordance with any wireless telecommunication system employing single frequency reuse or otherwise low reuse factor frequency planning, such as but not limited to other 3GPP communication systems, a 3GPP2 (Third Generation Partnership Project 2) Evolution or Phase 2 communication system, for example, a CDMA (Code Division Multiple Access) 2000 1XEV-DV communication system, a Wireless Local Area Network (WLAN) communication system as described by the IEEE 802.xx standards, for example, the 802.11a/Hiper-LAN2, 802.11g, or 802.20 standards, or a Worldwide Interoperability for Microwave Access (WiMAX) communication system that operates in accordance with the IEEE (Institute of Electrical and Electronics Engineers) 802.16 standards, including 802.16e and 802.16m.

In communication system 100, when a UE, such as UE 101, roams among cells/eNodeBs, a decision may be made to handover the UE from a serving eNodeB to a target eNodeB. Typically, a UE scans downlink reference signals transmitted by a serving eNodeB and by one or more neighboring eNodeBs based on a neighbor list provided to the UE by the serving eNodeB. The UE measures a signal quality of each such signal and reports the measurements and corresponding cell identifiers back to the serving eNodeB. Based on the reported signal qualities and cell identifiers, the serving eNodeB determines whether to handover the UE from the serving eNodeB to a target cell/eNodeB.

For example, in an LTE communication system, a UE, such as UE 101, monitors for a reference signal (RS) transmitted by each of multiple eNodeBs, for example, eNodeBs 110-111. The UE then may determine a power level of each received reference signal, that is, a Reference Signal Received Power (RSRP). For example, in one embodiment of the present invention, a UE may determine an RSRP by taking a linear average of downlink reference signals' power across a channel bandwidth. However, other methods are known for determining an RSRP and any such method may be used herein without departing from the spirit and scope of the present invention. The UE then conveys the determined RSRPs to the network, and in particular to the serving, or source, eNodeB and the source eNodeB determines, based on the received RSRPs, whether to initiate a handoff.

For example, when a UE is connected to a source eNodeB$_A$ and detects a reference signal from a potential target eNodeB$_B$ such that $RSRP_B > RSRP_A + HOM$, then source eNodeB$_A$ may determine to initiate a handoff to eNodeB$_B$, where $RSRP_A$ is the RSRP for a reference signal received from eNodeB$_A$, $RSRP_B$ is the RSRP for a reference signal received from eNodeB$_B$, and HOM is a handoff (HO) parameter that provides a difference between $RSRP_A$ and $RSRP_B$ such that a likelihood of the UE ping-ponging, handover-too-late, or handover-too-early between eNodeB$_A$ and eNodeB$_B$ is minimized. In other embodiments of the present invention, a handoff may be initiated by the UE—the location, in communication system 100, of the handoff decision in not critical to the present invention.

When a UE, such as UE 101, is transmitting uplink signals in communication system 100, the UE determines its maximum uplink transmit power level based on the PMAX message received from the eNodeB to which the UE is attached. For example, when UE 101 resides in high power cell 130 and is attached to corresponding high power eNodeB 110, the UE may transmit uplink signals at a power level as high as 33 dBm in response to a PMAX message received from eNodeB 110. When UE 101 then is handed over to boundary cell 131 and becomes attached to corresponding boundary eNodeB 111, the UE has to limit its' uplink transmit power level to a maximum of 32 dBm in response to a PMAX message received from eNodeB 111. And when UE 101 is handed over to low power cell 132 and becomes attached to corresponding low power eNodeB 112, the UE has to limit its' uplink transmit power level to a maximum of 23 dBm in response to a PMAX message received from eNodeB 112.

In the prior art, when a UE is attached to high power eNodeB and resides in a boundary area between a high power cell and a low power cell (that is, an overlapping area of the two cells), a high power uplink transmission by the UE, for example, at 2 W, may interfere with uplink transmissions by UEs residing in the low power cell and attached to a low power eNodeB, which UEs' uplink transmissions may be limited to a maximum uplink power level of 200 mW. This can be particularly problematic when a UE attached to a high power eNodeB and a UE attached to an adjacent low power eNodeB have been assigned a same one or more resource blocks by their respective eNodeBs. Furthermore, in prior art LTE communication systems, cell selection typically is based on best RSRP. An optimal handover point between a large (high power) cell, served by a high power eNodeB, and a small (low power) cell, served by a low power eNodeB, will be roughly halfway between the two cells, with a slight bias due to the HOM parameter. When there is a large size difference between the large cell and the small cell, this handover point may lie outside of the small cell's coverage area. Handover holes then may occur when a UE in the high power cell crosses the mid-point between the two cells and attempts to handoff to the small cell. During the handover process, the UE will receive the small cell PMAX and then reduce its transmit power, which may result in a dropped call or a ping-pong back to the original high power eNodeB.

In order to optimize system performance in a boundary area between a high power cell and a low power cell, communication system 100 provides a boundary cell, that is, cell 131, between a high power cell, that is, cell 130, and a low power cell, that is, cell 132. Communication system 100 further provides for a UE to determine whether the UE is in boundary state, that is, is attached to boundary eNodeB 131 and is between a high power cell and a boundary cell. When in a boundary state, the UE will set a maximum uplink transmit power level equal to the boundary cell PMAX. Communication system 100 also provides for a UE in a boundary cell to be in a low power state, that is, attached to a boundary eNodeB 131 and having a best neighbor, described in greater detail below, that is not a high power node. The best neighbor could be a low power eNodeB, for example, eNodeB 132, or a neighbor boundary eNodeB. When in a low power state, the UE will set a maximum uplink transmit power level that is less than or equal to the lesser of the PMAX of the serving cell and the PMAX of the best neighbor cell. In order to determine the appropriate PMAX level for the low power state, that is, the PMAX levels of the serving cell and the best neighbor cell, the UE may use neighbor cell information from memory table 305. By providing for the UE to set an appropriate maximum uplink transmit power level when in a boundary state or a low power state, communication system 100 minimizes a likelihood that the UE will encounter handover problems and reduces a potential for inter-cell interference.

Figure 5A:
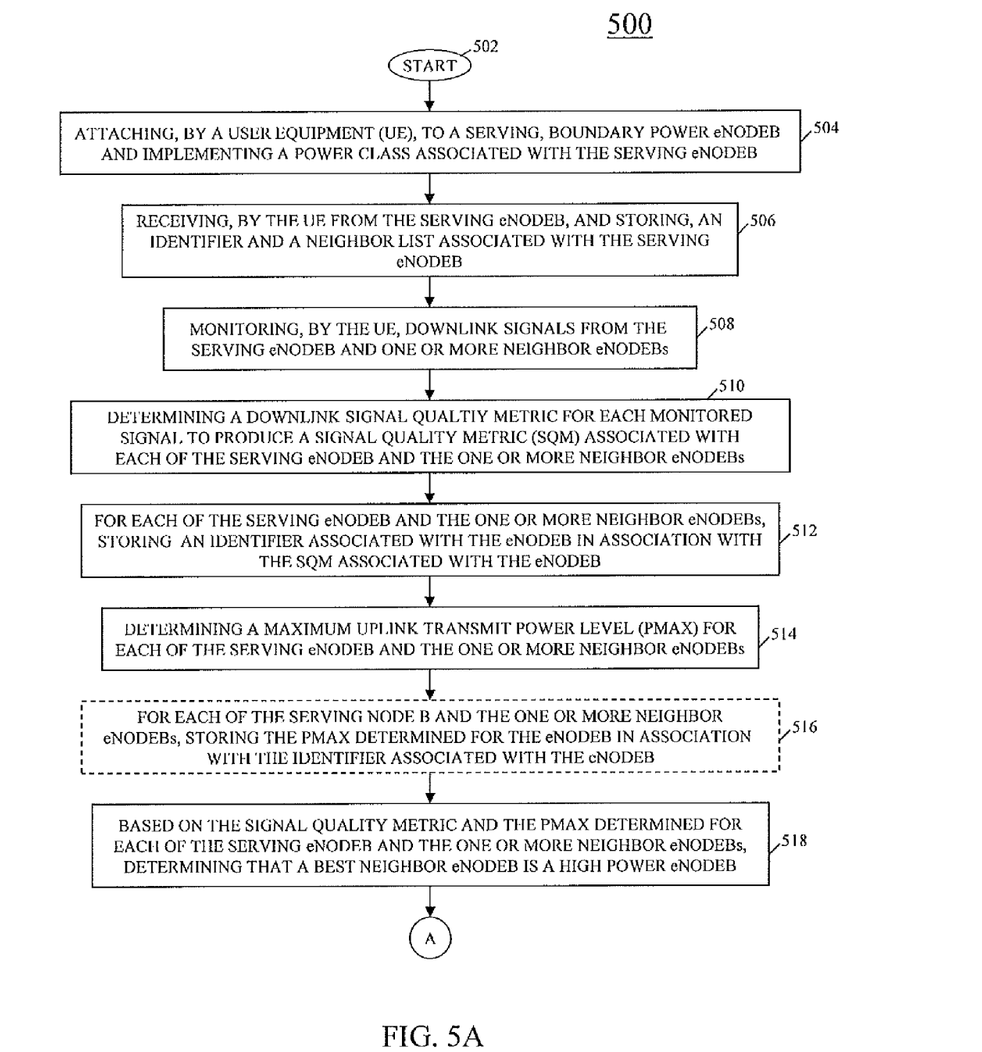
FIG. 5A is a logic flow diagram illustrating a method of uplink power control executed by the communication system of FIG. 1 in accordance with an embodiment of the present invention.
Figure 5B:
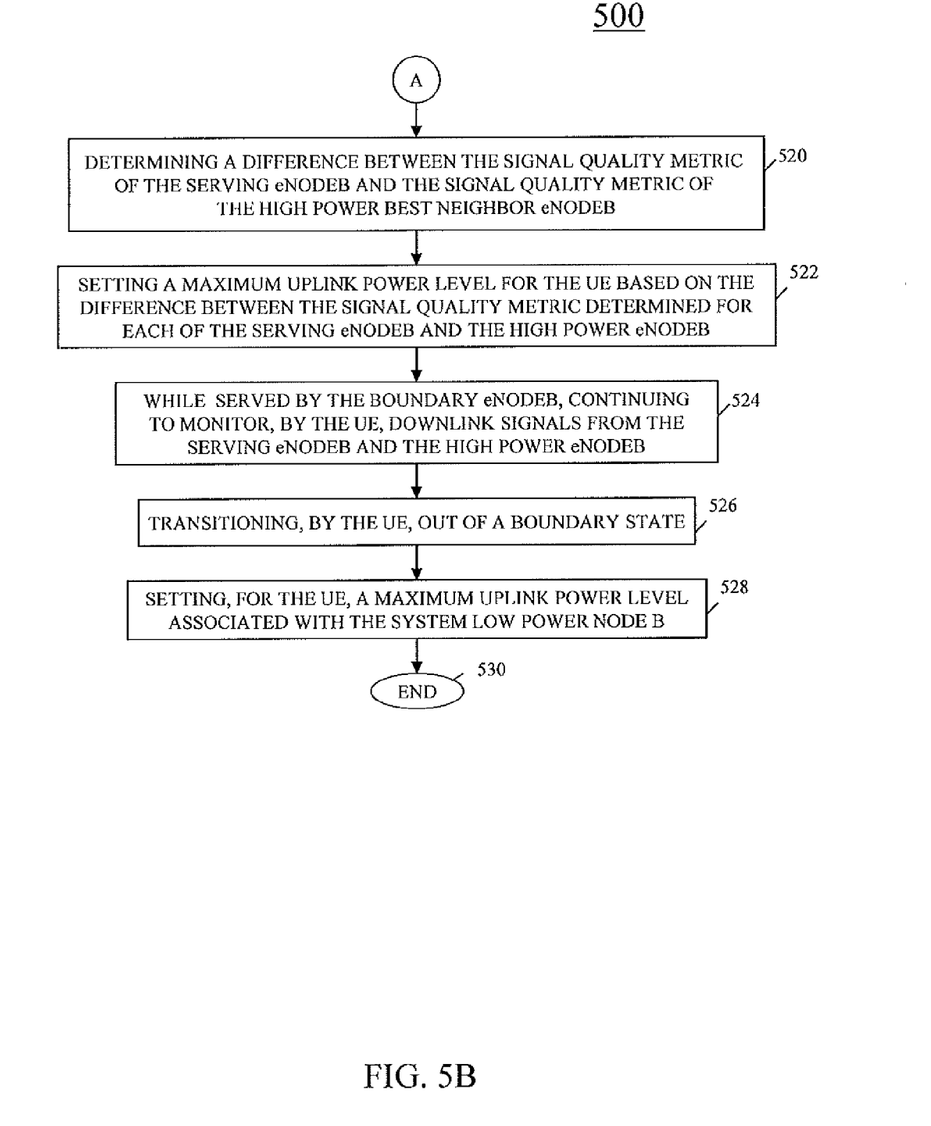
FIG. 5B is a continuation of the logic flow diagram of FIG. 5A illustrating a method of uplink power control executed by the communication system of FIG. 1 in accordance with an embodiment of the present invention.

Referring now to FIGS. 5A and 5B, a logic flow diagram 500 is provided that illustrates a method of uplink power control executed by communication system 100 in accordance with an embodiment of the present invention. Logic flow diagram 500 begins (502) when UE 101 attaches (504) to a serving eNodeB, for example, eNodeB 111, and implements a maximum uplink transmit power level (PMAX), associated with that eNodeB, that is, a boundary cell maximum uplink transmit power level (that is, a PMAX of 32 dBm) with respect to eNodeB 111. For example, UE 101 may move into a cell served by, and be handed off to, eNodeB 111 or may power up in the cell served by the eNodeB, that is, cell 131. As part of the attachment process, the UE receives (506) via receiver 306, and stores in at least one memory device 304 of the UE, an identifier associated with the serving eNodeB, such as a eNodeB identifier or a cell identifier, for example, a base station identifier (BS_ID), a Physical Cell Identifier (PCI), a Target Cell Identifier (TCI), and a E-UTRAN Cell Global Identifier (ECGI). Further, UE 101 receives (506) from serving eNodeB 111, and stores in at least one memory device 304 of the UE, a neighbor list that comprises a list of multiple neighbor eNodeBs/cells, such as eNodeBs 110 and 112 and corresponding cells 130 and 132, and an identifier associated with each eNodeB/cell included in the list, such as a eNodeB identifier or a cell identifier, for example, a base station identifier (BS_ID), a Physical Cell Identifier (PCI), a Target Cell Identifier (TCI), and a E-UTRAN Cell Global Identifier (ECGI). It is assumed herein that eNodeB 110 is a high power eNodeB, eNodeB 111 is a boundary power eNodeB, and eNodeB 112 is a low power eNodeB. For example, in an LTE communication system, an eNodeB may broadcast a neighbor list in an SIB3 element of an SI message.

UE 101 monitors (508), via receiver 306 of the UE, downlink reference signals transmitted by the serving eNodeB, that is, eNodeB 111, and one or more of the neighbor eNodeBs 110 and 112. UE 101 then determines (510) a signal quality metric (SQM) for each monitored reference signal and correspondingly in association with each of the multiple eNodeBs 110-112, and stores (512), in at least one memory device 304 of the UE, for example, in a table 305 maintained by the UE, each determined signal quality metric in association with an identifier associated with the corresponding eNodeB or cell. The signal quality metric may be, for example, a Reference Signal Received Power (RSRP) as employed by an LTE communication system; however, any measurement of signal quality that may occur to one of ordinary skill in the art may be employed herein, such as but not limited to a signal-to-noise ratio (SNR), a signal-to-interference-plus-noise ratio (SINR), a carrier-to-interference-plus-noise ratio (CINR), a bit energy-to-noise density ratio (Eb/Io), a bit error rate (BER).

In addition, UE 101 determines (514) a maximum uplink transmit power level (PMAX) associated with each of the multiple eNodeBs 110-112 and, if not already stored in table 305 of at least one memory device 304 of the UE, stores (516), in the at least one memory device, for example, in table 305, each determined PMAX in association with the corresponding eNodeB, that is, in association with the stored identifier associated with the eNodeB and/or the eNodeB's corresponding cell. For example, in an LTE communication system, an eNodeB may broadcast its maximum allowable uplink transmit power level (PMAX) in an overhead message such as in a SIB1 element of an SI message, that also identifies the eNodeB broadcasting the message. With respect to eNodeBs 110-112, eNodeB 110, as a high power eNodeB, would broadcast a PMAX message indicating that the eNodeB supports a high PMAX, such as 2 W (33 dBm), eNodeB 111, as a boundary eNodeB, would broadcast a PMAX message indicating that the eNodeB supports a boundary level PMAX, such as 32 dBm, and eNodeB 112, as a low power eNodeB, would broadcast a PMAX message indicating that the eNodeB supports a low PMAX, such as 200 mW (23 dBm). In response to receiving such PMAX messages, UE 101 may determine each eNodeB's PMAX based on the PMAX indicated in the monitored messages and store each determined PMAX in association with the corresponding eNodeB. By way of another example, the PMAX associated with each eNodeB 110-112 may be included in table 305 maintained by UE 101 and the UE may determine a maximum uplink transmit power level (PMAX) associated with each of the multiple eNodeBs 110-112 by reference to the table. In still other embodiments of the present invention, a boundary cell/eNodeB may indicate that it is boundary cell/eNodeB by use of any type of messaging and any type of indication, such as an extension to a known overhead message comprising a data field could have a boundary cell indicator, such as a flag of some type, that may occur to one of ordinary skill in the art.

Based on the signal quality metrics ('SQMs') determined for each of the serving eNodeB and the one or more neighbor eNodeBs, and on the PMAX associated with the serving eNodeB and the one or more neighbor eNodeBs, UE 101 then determines (520) whether the UE is in a boundary state, that is, is connected to a boundary serving cell eNodeB and is residing in an area between a high power eNodeB, or cell, and a boundary eNodeB, or cell. That is, based on the signal quality metrics determined by UE 101 for neighbor eNodeBs 110 and 112, the UE determines a best neighbor eNodeB, that is, a neighbor eNodeB with a best signal quality metric, for example, eNodeB 110.

Further, by reference to at least one memory device 304, for example, table 305, UE 101 determines a PMAX associated with each of the serving eNodeB 111 and neighbor eNodeBs 110 and 112, and based on the PMAX associated with each of the eNodeBs, UE 101 determines (518) that best neighbor eNodeB 110 is a high power eNodeB. For example, in one embodiment, at least one memory device 304 of UE 101 may be pre-configured with information identifying the PMAX of each of a high power eNodeB, a boundary eNodeB, and a low power eNodeB. Based on the PMAX broadcast by eNodeB 111, or by reference to table 305 maintained by the eNodeB, UE 101 is able to determine that eNodeB 110 is a high power eNodeB. By way of another example, in another embodiment, when the PMAX associated with best neighbor eNodeB 110 is greater than the PMAX associated with another neighbor eNodeB, for example, low power eNodeB 112, then UE 101 may determine that eNodeB 110 is a high power eNodeB.

As UE 101, in a boundary state, moves through a boundary cell, the UE controls its maximum output power level in order to reduce interference to neighboring eNodeBs. When a UE in a boundary state is closest to a high power eNodeB, it uses the boundary cell PMAX. As the UE approaches the boundary eNodeB, it transitions to using the PMAX of the boundary cell's low power neighbors. That is, UE 101, in a boundary state, determines (520) a difference, or delta, between the signal quality metric determined by UE 101 for serving eNodeB 111 ($SQM_{eNodeB\ 111}$) and the signal quality metric determined by the UE for best neighbor eNodeB 110 ($SQM_{eNodeB\ 110}$). The PMAX transition then may be determined based on the difference, or delta, between the signal quality metrics determined by UE 101 for each of serving eNodeB 111 and best neighbor eNodeB 110 ('$\Delta SQM$').

For example, in determining whether UE 101 should use the higher boundary PMAX level (as opposed to the PMAX level of a neighbor low power eNodeB), the UE may compare the difference, or delta, between the signal quality metric of serving eNodeB 111 and the signal quality metric of high power eNodeB 110 ($\Delta SQM$) to a signal quality metric differential threshold ('$\Delta SQM\_THRESH$') to produce a comparison. When the two signal quality metrics are close in value, for example, when their difference is less than the signal quality metric differential threshold (that is, $\Delta SQM<\Delta SQM\_THRESH$), then UE 101 may determine that the UE is at the cell edge near the high power eNodeB and should use the boundary cell PMAX, and when the two signal quality metrics are further apart in their values, for example, when their difference is greater than the signal quality metric differential threshold (that is, $\Delta SQM>\Delta SQM\_THRESH$), then UE 101 may determine that the boundary state UE is near the boundary eNodeB and should use the PMAX level of its low power neighbor eNodeB 112.

In other words, based on the comparison of the difference between the signal quality metric of the serving eNodeB 111 and the signal quality metric of high power eNodeB 110, UE 101 determines which side of a transition region, a region where the UE is in a boundary state, that is, is attached to a boundary cell/eNodeB and is residing in an overlapping coverage area of a high power cell/eNodeB and the boundary cell/eNodeB, it is on and sets (522) a corresponding maximum uplink power level class, that is, sets the UE's power class to a higher power (32 dBm) class, wherein the UE may transmit uplink signals at a maximum uplink power level of 32 dBm, or to a lower power (23 dBm) class, wherein the UE may transmit uplink signals at a maximum uplink power level of 23 dBm. Those skilled in the art, will recognize that the transition between using boundary PMAX and the low power PMAX can be a single knife edge switch between the two power levels or a continuously variable transition between the two PMAX levels based on the $\Delta SQM$ metrics described above.

For example, near the cell boundary, the SQM difference ($\Delta SQM$) between the serving boundary eNodeB 111 and the high power eNodeB 110 is small. The UE 101 compares this difference between the two signal quality metrics ($\Delta SQM=SQM_{eNodeB\ 111}-SQM_{eNodeB\ 110}$) to a signal quality metric differential threshold $\Delta SQM\_THRESH$. When $\Delta SQM<\Delta SQM\_THRESH$, then UE 101 may determine that it is located on the high power eNodeB side of the transition region between high power eNodeB 110 and boundary serving eNodeB 111 and set its power class to the power class associated with the boundary serving eNodeB. And when the SQM difference between the signal quality metric of boundary serving eNodeB 111 and the high power eNodeB 110 is greater than the signal quality metric differential threshold ($\Delta SQM>\Delta SQM\_THRESH$), then UE 101 may determine that it is located on the boundary eNodeB side of the transition region and set its power class to the power class associated with the low power eNodeB, that is, eNodeB 112.

In another embodiment of the present invention, in addition to a high power class, wherein UE 101 sets its maximum uplink transmit power to the PMAX of a boundary power eNodeB/cell, and a low power class, wherein UE 101 sets its maximum uplink transmit power to the PMAX of a low power eNodeB/cell, the UE also may consider, and set, a 'transition power class' wherein the UE gradually varies its maximum uplink power between the maximum uplink power level associated with the boundary power class and the maximum uplink power level associated with the low power class. For example, UE 101 may maintain a first, highest signal quality metric differential threshold ('$\Delta SQM\_THRESH\_HIGH$'), a second, lower signal quality metric differential threshold ('$\Delta SQM\_THRESH\_MID$'), and a third, lowest signal quality metric differential threshold ('$\Delta SQM\_THRESH\_LOW$'). UE 101 then may determine that it is in a transition region between a high power eNodeB, that is, eNodeB 110, and a boundary power serving eNodeB, that is, eNodeB 111, based on a comparison of the difference between the signal quality metric of the high power eNodeB and the signal quality metric of the boundary serving eNodeB ($\Delta SQM$) to the first signal quality metric differential threshold, $\Delta SQM\_THRESH\_HIGH$. For example, UE 101 may determine that it is in a transition region when the difference $\Delta SQM$ is less than $\Delta SQM\_THRESH\_HIGH$ (that is, $\Delta SQM<\Delta SQM\_THRESH\_HIGH$). When the signal quality metric difference is less than the first signal quality metric differential threshold, $\Delta SQM\_THRESH\_HIGH$, but greater than the second signal quality metric differential threshold, $\Delta SQM\_THRESH\_MID$ (that is, when $\Delta SQM\_THRESH\_HIGH>\Delta SQM>\Delta SQM\_THRESH\_MID$), then UE 101 may determine to set its maximum uplink transmit power level to the maximum uplink transmit power level (PMAX) of the boundary power class, for example, to the PMAX of serving, boundary power eNodeB 111. When the signal quality metric difference is less than the second signal quality metric differential threshold, $\Delta SQM\_THRESH\_MID$, but greater than the third signal quality metric differential threshold, $\Delta SQM\_THRESH\_LOW$ (that is, when $\Delta SQM\_THRESH\_MID>\Delta SQM>\Delta SQM\_THRESH\_LOW$), then UE 101 may determine to set its maximum uplink transmit power level to that of the 'transition power class.' And when the signal quality metric difference is less than the third signal quality metric differential threshold, $\Delta SQM\_THRESH\_LOW$ (that is, when $\Delta SQM<\Delta SQM\_THRESH\_LOW$), then UE 101 may determine to set its maximum uplink transmit power level to the maximum uplink transmit power level of the low power class, for example, to the PMAX of low power eNodeB 112. For example, when the UE is transitioning from the edge of serving, boundary power cell 131/eNodeB 111 toward the center of the boundary cell, the UE may gradually reduce its maximum uplink transmit power level while in the transition region from the PMAX of the boundary power class (32 dBm) to the PMAX of the low power class (23 dBm), for example, in multiple steps or linearly over time.

While in the transition region, UE 101 continues to monitor (524), via receiver 306 of the UE, downlink reference signals transmitted by serving eNodeB 111, and neighbors eNodeB 110 and eNodeB 112. In addition to monitoring signal quality metrics of serving and neighbor nodes, the UE also monitors requests for handover to neighbor nodes. Changes in either the signal quality metrics or a handover to a new eNodeB can cause UE 101 to drop out of the boundary state. While in the boundary state (that is, in the transition region and attached to boundary, serving eNodeB 111), if UE 101 determines that high power eNodeB 110 is no longer the best neighbor, and that a low power, or a boundary power, eNodeB is now the best neighbor, then the UE transitions (526) out of the boundary state and transitions (528) into a low power state. That is, while attached to boundary, serving eNodeB 111 and when a best neighbor eNodeB is not a high power eNodeB, UE 101 sets its maximum uplink transmit power level to the level of the low power eNodeB, for example, eNodeB 112. In response to determining, by UE 101, that it has transitioned out of the boundary state (but is still attached to boundary eNodeB 111), UE 101 implements a power class, that is, set its maximum uplink transmit power level (PMAX), to a PMAX associated with the low power cell 132/eNodeB 112. For example, UE 101 may set the UE's maximum transmit power level by either adjusting PMAX into the at least one memory device 304 of the UE or by modifying the UE's power class, also within the UE's at least one memory device. Logic flow 500 then ends (530).

UE 101 also leaves the boundary state if a handover occurs to a neighboring high power eNodeB 110 or low power eNodeB 112. When a UE is not attached to a boundary eNodeB, it sets maximum transmit power to the PMAX broadcast by the new serving cell.

For example, UE 101 may compare the difference, or delta, between the signal quality metric of high power eNodeB 110 and the signal quality metric of boundary, serving eNodeB 111 ($\Delta$SQM) to the signal quality metric differential threshold ($\Delta$SQM_THRESH), or to a highest signal quality metric differential threshold ($\Delta$SQM_THRESH_HIGH) when there are two or more signal quality metric differential thresholds, for example, a first, higher signal quality metric differential threshold ($\Delta$SQM_THRESH_HIGH) and a second, lower signal quality metric differential threshold ($\Delta$SQM_THRESH_LOW), to produce a second comparison. Based on the second comparison, UE 101 may determine that the UE has left the boundary state, for example, when the difference between the two signal quality metrics is greater than the signal quality metric differential threshold (that is, $\Delta$SQM>$\Delta$SQM_THRESH when there is a single threshold or $\Delta$SQM>$\Delta$SQM_THRESH_HIGH when there are two or more signal quality metric differential thresholds) and the signal quality metric of boundary, serving eNodeB 111 is greater than the signal quality metric of high power eNodeB 110.

By providing for UE 101 to determines which side of a transition region, that is, a region where the UE is attached to a boundary cell and resides in an overlapping coverage area of a high power cell/eNodeB and a boundary cell/eNodeB, it is on and to correspondingly set a maximum uplink transmit power level (PMAX), communication system 100 minimizes a likelihood that a high power uplink transmission by the UE, for example, at 2 W, may interfere with uplink transmissions by UEs residing in a nearby low power cell and attached to a low power eNodeB, which UEs' uplink transmissions may be limited to a maximum uplink transmit power level of 200 mW. Furthermore, by controlling an adjustment of the UE's PMAX as the UE roams from a high power cell/eNodeB toward a low power cell/eNodeB, providing for the UE to transition from a high power, to a boundary power, to a low power PMAX, communication system 100 minimizes the occurrence of handover holes, wherein a UE in a high power cell crosses the mid-point between the two cells and attempts to handoff to a low power cell and during which the UE may receive the low power cell/eNodeB PMAX and then reduce its transmit power, which may result in a dropped call or a ping-pong back to the original high power cell/eNodeB.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for setting a maximum uplink transmit power of a user equipment in an Orthogonal Frequency Division Multiple Access communication system, the method comprising:
   monitoring downlink signals from a serving eNodeB and one or more neighbor eNodeBs, wherein the serving eNodeB is a boundary eNodeB and wherein a boundary eNodeB is an eNodeB that supports a maximum uplink transmit power level that is between a maximum uplink transmit power level supported by a high power eNodeB and a maximum uplink transmit power level supported by a low power eNodeB;
   determining a signal quality metric for each monitored signal to produce a signal quality metric associated with each of the serving eNodeB and the one or more neighbor eNodeBs;
   determining a maximum uplink transmit power level for each of the serving eNodeB and the one or more neighbor eNodeBs;
   for each of the serving eNodeB and the one or more neighbor eNodeBs, storing the maximum uplink transmit power level determined for the eNodeB in association with an identifier associated with the eNodeB;
   based on the determined signal quality metrics and maximum uplink transmit power levels, determining whether a neighbor eNodeB of the one or more neighbor eNodeBs with a best signal quality metric is a high power eNodeB;
   in response to determining that the neighbor eNodeB of the one or more neighbor eNodeBs with a best signal quality metric is a high power eNodeB, determining a difference between the signal quality metric associated with the high power eNodeB and the signal quality metric associated with the boundary eNodeB; and
   setting a maximum uplink transmit power level for the user equipment based on the difference determination.

2. The method of claim 1, wherein determining the signal quality metric for each monitored signal comprises determining a Reference Signal Received Power (RSRP) for each monitored signal.

3. The method of claim 1, wherein determining the maximum uplink transmit power level for each of the serving eNodeB and the one or more neighbor eNodeBs comprises receiving an overhead message from each of the serving eNodeB and the one or more neighbor eNodeBs, wherein the overhead message indicates maximum uplink transmit power level associated with the eNodeB.

4. The method of claim 1, wherein determining the maximum uplink transmit power level for each of the serving eNodeB and the one or more neighbor eNodeBs comprises referencing a table listing the maximum uplink transmit power level for each of the serving eNodeB and the one or more neighbor eNodeBs.

5. The method of claim 4, wherein the table listing the maximum uplink transmit power level for each of the serving eNodeB and the one or more neighbor eNodeBs uniquely identifies the serving eNodeB and locally identifies each of the neighbor eNodeBs.

6. The method of claim 1, wherein setting the maximum uplink transmit power level for the user equipment comprises comparing a difference between the signal quality metric of the high power eNodeB and the signal quality metric of the boundary eNodeB to a difference threshold to produce a comparison and setting the maximum uplink transmit power level based on the comparison.

7. The method of claim 6, wherein setting the maximum uplink transmit power level for the user equipment based on the comparison comprises:
   when the difference between the signal quality metric of the high power eNodeB and the signal quality metric of the boundary eNodeB is less than the difference threshold, setting the maximum uplink power level for the user equipment to the maximum uplink transmit power level supported by the boundary eNodeB; and
   when the difference between the signal quality metric of the high power eNodeB and the signal quality metric of the boundary eNodeB is greater than the difference threshold, setting the maximum uplink power level for the user equipment to the maximum uplink transmit power level supported by a low power eNodeB.

8. The method of claim 1, wherein setting the maximum uplink transmit power level for the user equipment comprises setting the maximum uplink power level associated with the boundary eNodeB and wherein the method further comprises gradually reducing the maximum uplink transmit power level of the user equipment from the maximum uplink power level supported by the boundary eNodeB to the maximum uplink transmit power level supported by the low power eNodeB.

9. The method of claim 1, wherein setting the maximum uplink transmit power level for the user equipment (UE) comprises comparing the difference determination to one or more of a plurality of difference thresholds and,
   when the signal quality difference is less than the plurality of difference thresholds, setting the maximum uplink transmit power level for the UE to the maximum uplink transmit power level supported by the high power eNodeB,
   when the signal quality difference is greater than a first threshold of the plurality of thresholds and less than a second threshold of the plurality of difference thresholds and the signal quality metric associated with the boundary eNodeB is greater than the signal quality metric associated with the high power eNodeB, setting the maximum uplink transmit power level for the UE to the maximum uplink transmit power level supported by the boundary eNodeB, and
   when the signal quality difference is greater than the plurality of difference thresholds and the signal quality metric associated with the boundary eNodeB is greater than the signal quality metric associated with the high power eNodeB, setting the maximum uplink transmit power level for the UE to the maximum uplink transmit power level associated with the low power eNodeB.

10. The method of claim 1, wherein setting the maximum uplink transmit power level for the user equipment comprises modifying one or more of the maximum uplink transmit power level of the user equipment and a power class of the user equipment.

11. A user equipment (UE) capable of operating in an Orthogonal Frequency Division Multiple Access communication system, the UE comprising:
   a receiver that is configured to monitor downlink signals from a serving eNodeB and one or more neighbor eNodeBs; and
   a processor that is configured to:
      monitor downlink signals from a serving eNodeB and one or more neighbor eNodeBs, wherein the serving eNodeB is a boundary eNodeB and wherein a boundary eNodeB is an eNodeB that supports a maximum uplink transmit power level that is between a maximum uplink transmit power level supported by a high power eNodeB and a maximum uplink transmit power level supported by a low power eNodeB;

determine a signal quality metric for each monitored signal to produce a signal quality metric associated with each of the serving eNodeB and the one or more neighbor eNodeBs;

determine a maximum uplink transmit power level for each of the serving eNodeB and the one or more neighbor eNodeBs;

for each of the serving eNodeB and the one or more neighbor eNodeBs, store the maximum uplink transmit power level determined for the eNodeB in association with an identifier associated with the eNodeB;

based on the determined signal quality metrics and maximum uplink transmit power levels, determine a neighbor eNodeB of the one or more neighbor eNodeBs with a best signal quality metric;

in response to determining that the neighbor eNodeB of the one or more neighbor eNodeBs with a best signal quality metric is a high power eNodeB, determine a difference between the signal quality metric associated with the high power eNodeB and the signal quality metric associated with the boundary eNodeB; and set a maximum uplink transmit power level for the user equipment based on the difference determination.

12. The user equipment of claim 11, wherein the processor is configured to determine a signal quality metric for each monitored signal by determining the Reference Signal Received Power (RSRP) for each monitored signal.

13. The user equipment of claim 11, wherein the processor is configured to determine the maximum uplink transmit power level for each of the serving eNodeB and the one or more neighbor eNodeBs by receiving an overhead message from each of the serving eNodeB and the one or more neighbor eNodeBs, wherein the overhead message indicates maximum uplink transmit power level associated with the eNodeB.

14. The user equipment of claim 11, wherein the processor is configured to determine the maximum uplink transmit power level for each of the serving eNodeB and the one or more neighbor eNodeBs by referencing a table listing the maximum uplink transmit power level for each of the serving eNodeB and the one or more neighbor eNodeBs.

15. The user equipment of claim 11, wherein the processor is configured to set the maximum uplink transmit power level for the user equipment comprises comparing a difference between the signal quality metric of the high power eNodeB and the signal quality metric of the boundary eNodeB to a difference threshold to produce a comparison and set the maximum uplink transmit power level based on the comparison.

16. The user equipment of claim 15, wherein the processor is configured to set the maximum uplink transmit power level for the user equipment based on the comparison by:

when the difference between the signal quality metric of the high power eNodeB and the signal quality metric of the boundary eNodeB is less than the difference threshold, set the maximum uplink power level for the user equipment to the maximum uplink transmit power level supported by the boundary eNodeB; and when the difference between the signal quality metric of the high power eNodeB and the signal quality metric of the boundary eNodeB is greater than the difference threshold, set the maximum uplink power level for the user equipment to the maximum uplink transmit power level supported by a low power eNodeB.

17. The user equipment of claim 11, wherein the processor is configured to set the maximum uplink transmit power level for the user equipment by setting the maximum uplink power level associated with the boundary eNodeB and wherein the method further comprises gradually reduce the maximum uplink transmit power level of the user equipment from the maximum uplink power level supported by the boundary eNodeB to the maximum uplink transmit power level supported by the low power eNodeB.

18. The user equipment of claim 11, wherein the processor is configured to set the maximum uplink transmit power level for the user equipment (UE) by comparing the difference determination to one or more of a plurality of difference thresholds and, when the signal quality difference is less than the plurality of difference thresholds, set the maximum uplink transmit power level for the UE to the maximum uplink transmit power level supported by the high power eNodeB, when the signal quality difference is greater than a first threshold of the plurality of thresholds and less than a second threshold of the plurality of difference thresholds and the signal quality metric associated with the boundary eNodeB is greater than the signal quality metric associated with the high power eNodeB, set the maximum uplink transmit power level for the UE to the maximum uplink transmit power level supported by the boundary eNodeB, and when the signal quality difference is greater than the plurality of difference thresholds and the signal quality metric associated with the boundary eNodeB is greater than the signal quality metric associated with the high power eNodeB, set the maximum uplink transmit power level for the UE to the maximum uplink transmit power level associated with the low power eNodeB.

19. The, user equipment of claim 11, wherein the processor is configured to set the maximum uplink transmit power level for the user equipment (UE) by modifying one or more of the maximum uplink transmit power level maintained by the UE and a power class maintained by the UE.

* * * * *